May 31, 1932. C. G. RENOLD 1,860,597

CONVEYER CHAIN AND THE LIKE

Filed July 25, 1929

INVENTOR
Charles G. Renold
BY
Gill & Jennings
ATTORNEYS

Patented May 31, 1932

1,860,597

UNITED STATES PATENT OFFICE

CHARLES GARONNE RENOLD, OF DIDSBURY, MANCHESTER, ENGLAND, ASSIGNOR TO HANS RENOLD LIMITED, OF MANCHESTER, ENGLAND, A BRITISH COMPANY

CONVEYER CHAIN AND THE LIKE

Application filed July 25, 1929, Serial No. 381,030, and in Great Britain September 27, 1928.

This invention relates to chains consisting of inner and outer links each built up of a pair of side plates connected together by hollow bushes or hollow or solid rivets, such chains being adapted either for purposes of power transmission or for carrying attachments such as conveyer buckets or slats, elevator buckets or treads, feeding elements and so forth.

The invention is concerned with the particular variety of such chain constructed to bend in two planes and consequently, in addition to the normal joints or pivots allowing of bending in the plane necessary for passing round the driving or supporting sprockets, has additional joints either at every link or more widely spaced for allowing of flexing in a plane at right angles to that of the sprockets. Such chains are mainly employed in connection with conveying and like devices for making it possible for the attachments after travelling in a given plane to be diverted so that they continue to move in another plane usually parallel to the first.

For chains of the kind in question, the simplest form of right-angled joint to meet this requirement is a block drilled at right angles, or a fork drilled at right angles, or the combination of the two. Such joints, however, have a number of disadvantages including that of needing complicated machinery for the manufacture and machining of the elements and, in the case of a fork, the stud or hollow bush forming the jointing member must be inserted from one side and cannot have shoulders at each end, and is difficult to secure.

The present invention aims at producing a built-up construction of the joint members designed to overcome the above objections, and also to accommodate a great variety of chain pitches without needing so large a number of elements or parts as to make standardization difficult.

According to the present invention, chains built up of side plates and joint members to be capable of bending in two planes are provided with joint elements each containing two parallel pairs of plate sections fixed at right angles to each other and respectively carrying the hollow bushes forming the joint members in the two planes at right angles, while a locking or key member is introduced in the space between the four plates where they overlap and having engagement with the four plates so as to take the pull in the chain.

The locking or key member is conveniently a small rectangular plate having engagement in slots in both pairs of the link plates, because that takes up a minimum amount of the length of the chain, but the locking or key members may be blocks with holes at right angles for rivets to pass through, or may be rectangular plates with projecting studs formed on their edges, which studs pass through holes in the plates and act as rivets and if desired, the key members may be made integral with at least one pair of the plates which they serve to connect.

In order that the invention may be clearly understood and readily carried into effect, two examples of construction of chains in accordance therewith are illustrated in the accompanying drawings, wherein:—

Figure 2 is a plan of the same with the right-hand part in section; while

Figure 1:
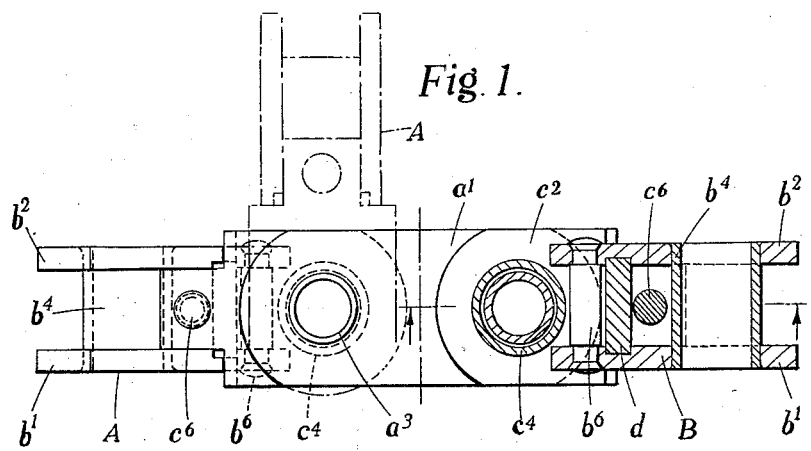
Figure 1 is a side elevation, with the right-hand half in section, of a pair of identical joint elements connected together by outer link plates.
Figure 2:
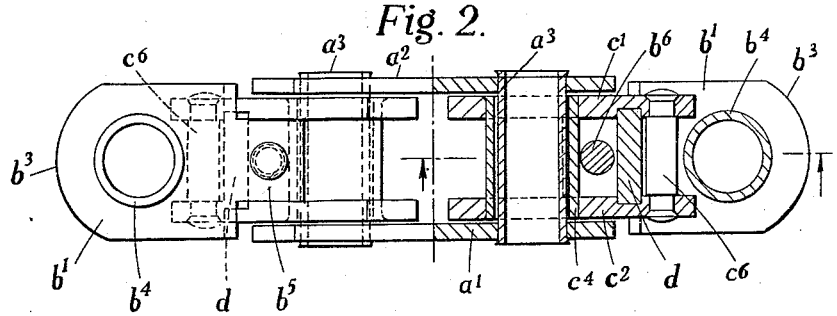

Referring first to Figures 1 and 2, two joint elements, indicated generally at A and B, are connected together by a pair of outer link plates $a^1$ and $a^2$.

In the drawings, the link plates $a^1$, $a^2$ are of the minimum length for the construction of chain, but obviously for a chain of greater pitch the link plates can be longer. In the normal case the distance between the centres of the bushes $b^4$ is the same as the pitch of the chain itself, single teeth being removed from the sprocket-wheels at the appropriate intervals to provide the necessary gaps to receive the pairs of joint elements; but if the joint elements are used in a chain the pitch of which is less than the minimum distance between these centres, then the outer link plates $a^1$ and $a^2$ are made of such a length that the distance between centres is a whole number of chain pitches and more than one sprocket tooth is removed to receive the assembly.

Each of the joint elements A and B comprises a pair of plates $b^1$ and $b^2$, very similar to the end part of an ordinary side plate of the links of sprocket chains, that is to say, the plates $b^1$ and $b^2$ are generally rectangular with their ends curved at $b^3$ to the curvature of the hole in the plates in which the jointing bush $b^4$ fits. Near the other end each of the plates is cut away on either side to leave the extreme end part $b^5$ rectangular in shape, but narrower than the main parts of the plates $b^1$ and $b^2$. There are two similar plates $c^1$ and $c^2$ placed in a plane at right angles to complete each of the joint elements A and B, and they are similarly connected together by a hollow bush $c^4$. Incidentally, the bushes $b^4$ and $c^4$ may conveniently be made by coiling up a flat strip of metal. It will be seen that the two joint elements A and B are joined together by the outer link plates $a^1$ and $a^2$, which are formed with holes in which hollow studs $a^3$ are fixed and which also pass through and make a hinged joint with the bushes $c^4$.

There is naturally between the bushes $b^4$ and $c^4$, whose axes are at right angles, a clearance space, which in practice usually needs to be kept as short as possible in order to keep the pitch of the joint element down to the pitch desired. In this space the locking or key member, shown at $d$, is placed.

The member $d$ is a small plate of square shape and rectangular section, and on its four sides it is recessed into grooves in the four plates $b^1$, $b^2$, $c^1$ and $c^2$, as perhaps is most clearly seen to the right of Figures 1 and 2. The result is that as long as the plates $b^1$ and $b^2$, for example, cannot spread apart and also the plates $c^1$ and $c^2$ cannot spread apart, they are held in engagement with the member $d$, so that the latter is able completely to take the pull in the chain. In order to make the construction practical, the extending end parts of the plates $b^1$ and $b^2$ are connected together by a small solid rivet $b^6$, and similarly the two plates $c^1$ and $c^2$ are also kept from spreading by a solid rivet $c^6$. These rivets hold the plates in correct spacing and prevent them from tipping. As already mentioned, these rivets may pass through the key member itself instead of being placed on each side of it. In this case the key member must be in the form of a block instead of a plate. Or again, as already mentioned, the rivets may be projections formed on the edges of the key plate itself.

As already mentioned, the connecting outer plates $a^1$ and $a^2$ can be any desired length, according to the pitch of the chain desired, and instead of employing hollow studs $a^3$, it is clear that solid studs passing through the hollow bushes and the plates $a^1$ and $a^2$ could be employed instead.

It may be noted that this form of construction has the advantages that it is cheap and standardization of the parts is carried as far as possible, because apart from the plates $a^1$ and $a^2$ and the studs $a^3$, all the joint elements are made up of exactly similar parts, all the plates, bushes and rivets being identical.

These joint elements can be adapted to the conditions of many problems, because conveyer or like attachments can be fixed either to the outside of the link plates $a^1$ and $a^2$, or can be secured by bolts or their equivalents passing through the hollow studs $a^3$, or by using extended studs, either hollow or solid, or the outer link plates $a^1$ and $a^2$ may be given a special form so as to be themselves the attachment. On the other hand, as already explained, this construction can only be used when the pitch of the chain is relatively long, unless groups of two or more sprocket teeth are removed, which is often undesirable. With this form of construction the intervening chain between the adjacent pairs of joint elements must have an odd number of pitches.

Figure 3:
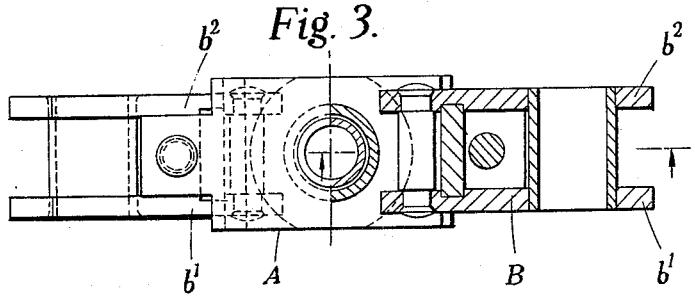
Figure 3 is a side elevation of a compound joint element without connecting plates, the right-hand part also being in section; and finally
Figure 4:
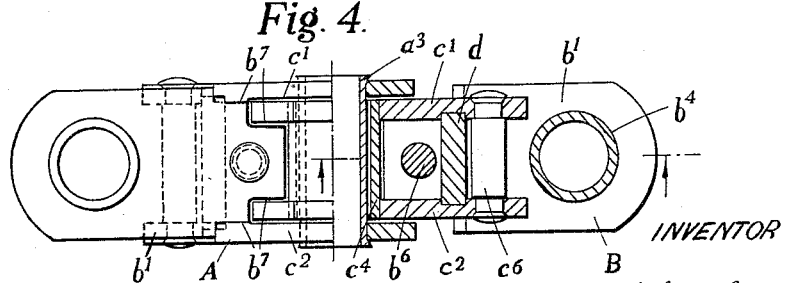
Figure 4 is a plan of the compound joint element shown in Figure 3 with the right-hand part in section.

In the form of construction shown in Figures 3 and 4, the joint elements are not absolutely identical, but have been slightly modified in order to enable two of them to be linked directly together without the interposition of the outer link plates $a^1$ and $a^2$ to constitute a compound joint element. In these figures the extreme right-hand joint element B is constructed precisely as in Figures 1 and 2, and consists, as before, of a pair of plates $b^1$ and $b^2$ and a pair of plates at right angles $c^1$ and $c^2$ spaced apart respectively by rivets $b^6$ and $c^6$ and bearing the joint bushes $c^4$ and $b^4$, while the key member is again shown as a small square plate $d$. The other joint member is very similar to it, but in this case the plates $b^1$ and $b^2$ are slightly different in shape, having a double step as shown at $b^7$ near their narrower ends so as to accommodate the plates $c^1$ and $c^2$ sufficiently far apart to embrace, and act as outer link plates to, the plates $c^1$ and $c^2$ of the right-hand joint element B. The plates $c^1$ and $c^2$ of the element A are then formed with holes to receive directly the hollow stud $a^3$, which with the bush $c^4$ makes a direct pivoted joint between the joint elements A and B.

The plates $b^1$ and $b^2$ of the joint element A may either be arranged to receive a hollow bush $b^4$, as shown, or to receive a hollow stud similar to that shown at $a^3$.

This second form of construction has the advantages that it allows the pitch between the two end bushes $b^4$ to be less than in the case of a pair of joint elements according to the first construction, and so can be used with a shorter pitch of chain without the necessity of removing more than one tooth in the chain wheel. When constructed as illustrated in Figures 3 and 4, its two ends are alike and must be linked to outer combinations of the chain, as in the construction shown in Figures 1 and 2. Hence the number of chain pitches between consecutive compound joint elements must be odd. If, however, both joint elements are made like the left-hand joint element A, that is, with one pair of plates widely spaced and the other narrowly spaced, the compound joint element will have one end wide and the other end narrow and therefore an inner combination must be linked to the wide end and an outside combination to the narrow end. Then, according to whether the compound joint-elements are placed with their wide ends all facing the same way, or alternately in opposite directions, the number of intervening chain-pitches may be even or odd. While the joint elements of Figures 1 and 2 cound be similarly modified this is not generally desirable as it would destroy the simplicity of their design, impair their suitability for standardization and consequently increase their cost. The form shown in Figures 3 and 4 must, however, in any case be made specially to suit the pitch of the chain in each particular case and the further modification which enables either an odd or an even number of pitches of the intervening chain between adjacent compound joint elements to be accommodated can be obtained without still further cost. This form does not allow such latitude in the attachment of the conveyer elements, which are in practice limited to attachments which can be fixed by bolts or the equivalent passing through the hollow jointing studs $a^3$.

In all of the novel constructions described above, the plate elements can be assembled on to the ends of the hollow bushes or of the hollow or solid studs, which can therefore, be formed with shoulders. This enables a more rigid construction to be obtained than is possible if the bushes or studs have to be pressed in from one side of the chain. Moreover, it makes it possible to use studs or bushes furnished with projecting keys at their ends in any of the ways set forth in the specification of United States patent application Serial No. 238,598 filed 8th December 1927, or of United States patent application Serial No. 287,319 filed 21st June 1928.

It may be pointed out that chains with the improved joint members can be guided in both planes by guiding rails or channels or wheels. In the one plane in which the ordinary chain joints lie, the chain will gear with the ordinary wheels which have gaps to clear the joint elements, as already explained. There is no difficulty in guiding such chains; the guide rails or other guiding devices may be mounted above the chain or below the chain, or on the centre line of the chain.

I claim:—

1. In a chain of the kind described, a joint member comprising in combination two pairs of side plates the plates of each pair being disposed parallel to one another, two bushes one secured between each pair of side plates, the two pairs of side plates being rigidly fixed together end-to-end with their planes mutually at right angles and their ends overlapping, and a key member located within the space between the overlapping ends and engaging with all four of said plates in a tension-resisting manner.

2. In a chain of the kind described, a joint member comprising in combination two pairs of side plates the plates of each pair being disposed parallel to one another, two bushes one secured between each pair of side plates, the two pairs of side plates being rigidly fixed together end-to-end with their planes mutually at right angles and their ends overlapping, and the inner faces of said end plates where they overlap being formed with recesses, and a key plate located within the space between the overlapping ends and engaging within all four of said recesses.

3. In a chain of the kind described, a joint member comprising in combination two pairs of side plates the plates of each pair being disposed parallel to one another, two bushes one secured between each pair of side plates, the two pairs of side plates being rigidly fixed together end-to-end with their planes mutually at right angles and their ends overlapping and the inner faces of said end plates where they overlap being formed with grooves extending across the width of said end plates, and a rectangular key plate located within the space between the overlapping ends and engaging on all four edges within said grooves.

4. In a chain of the kind described, a joint member comprising in combination two pairs of side plates the plates of each pair being disposed parallel to one another, two bushes one secured between each pair of side plates, the two pairs of side plates being rigidly fixed together end-to-end with their planes mutually at right angles and their ends overlapping, a key member located within the space between the overlapping ends and engaging with all four of said plates in a tension-resisting manner, and means for holding the end plates of each pair together.

5. In a chain of the kind described, a joint member comprising in combination two pairs of side plates the plates of each pair being disposed parallel to one another, two bushes one secured between each pair of side plates, the two pairs of side plates being rigidly fixed together end-to-end with their planes mutually at right angles and their ends overlapping, a key member located within the space between the overlapping ends and engaging with said plates in a tension-resisting manner, and means for holding the end plates of each pair together at a point on the side of the key member remote from the bush.

6. In a chain of the kind described, a joint member comprising in combination two pairs of side plates the plates of each pair being disposed parallel to one another, two bushes one secured between each pair of side plates, the two pairs of side plates being rigidly fixed together end-to-end with their planes mutually at right angles and their ends overlapping, a key member located within the space between the overlapping ends and engaging with said plates in a tension resisting manner, and a rivet extending through the end plates of each pair and holding said end plates together.

7. In a chain of the kind described, a joint member comprising in combination two pairs of side plates the plates of each pair being disposed parallel to one another, two bushes one secured between each pair of side plates near one end thereof, the two pairs of side plates being rigidly fixed together end-to-end with their planes mutually at right angles and their ends remote from the bushes overlapping, and a key member located within the space between the overlapping ends and engaging with said plates in a tension-resisting manner.

8. In a chain of the kind described, a joint member comprising in combination two pairs of side plates the plates of each pair being disposed parallel to one another, two bushes one secured between each pair of side plates, the two pairs of side plates being wider than their separation and being notched at the corners at one end and rigidly fixed together with their planes mutually at right angles, their said ends overlapping and the notched portions of one pair fitting closely between the inner faces of the other pair, and a key member located within the space between the overlapping ends and engaging with said plates in a tension-resisting manner.

9. In a chain of the kind described, a joint member comprising in combination two pairs of side plates the plates of each pair being disposed parallel to one another at a distance apart equal to the separation of the other pair, two bushes one secured between each pair of side plates, the two pairs of side plates being wider than their separation and being notched at the corners at one end and rigidly fixed together with their planes mutually at right angles, their said ends overlapping and the notched portions of one pair fitting closely between the inner faces of the other pair, and a key member located within the space between the overlapping ends and engaging with said plates in a tension-resisting manner.

10. A chain of the kind described comprising a plurality of pairs of joint members according to claim 1 in combination with pairs of side plates each pair jointed at opposite ends to adjacent bushes of a pair of joint members.

11. A chain of the kind described comprising a plurality of pairs of joint members each comprising in combination two pairs of side plates the plates of each pair being disposed parallel to one another, two hollow bushes one secured between each pair of side plates, the two pairs of side plates being assembled and fixed together end-to-end with their planes mutually at right angles and their ends overlapping, one of the pair of joint members having the distance between one pair of side plates exceeding the distance between the other pair and the bush secured between said first-mentioned pair being of such a diameter as to extend through the adjacent bush of the other joint member of the pair.

In witness whereof I hereunto subscribe my name this 10th day of July, 1929.

CHARLES GARONNE RENOLD.